Dec. 3, 1963 H. A. LEEDER, JR 3,113,242

FLASHING LAMP CIRCUIT USING A TRANSISTOR OSCILLATOR

Filed Dec. 14, 1961

INVENTOR.
HARRY A. LEEDER JR.
BY Richard von K. Braun
Atty.

United States Patent Office 3,113,242
Patented Dec. 3, 1963

3,113,242

FLASHING LAMP CIRCUIT USING A TRANSISTOR OSCILLATOR

Harry A. Leeder, Jr., Skaneateles, N.Y., assignor to R. E. Dietz Company, Syracuse, N.Y., a corporation of New York Filed Dec. 14, 1961, Ser. No. 159,239
10 Claims. (Cl. 315—209)

This invention relates generally to electrical signal generators or oscillator circuits, and has particular reference to such a circuit in which a semi-conductor device is used in conjunction with a relay for switching relatively heavy load currents.

The circuit of the invention is particularly adapted for use in flashing auto lamps where a high load capacity is required. Conventional auto lamp flashers are limited in the amount of load current which can be switched off and on, the current being ordinarily of the order of 4 amperes.

Heavy duty trucks require as many as 8 or more signal lights with a consequent load of the order of 16 amperes which must be switched on and off. In the circuit of the present invention the load current is carried by a heavy duty relay contact so that the range of load currents possible is greatly extended. The circuit provides for reliable operation over a long period of use with low cost components. The arrangement of the components in the circuit is such that the heavier the load current, the more positive the operation, and, by a proper choice of components, the flash frequency may be set for any point between 60 and 120 per minute.

The primary object of the invention, accordingly, is to provide an electronic switching device for flashing automotive lamps which is simple and economical in construction and is stable and efficient in operation.

Another important object is to provide an electronic switching device which is capable of switching heavy load currents with high efficiency.

A further object is to provide a switching device in which the timing and operating cycles are uniform.

A still further object is to provide a switching device in which a relatively low value capacitor and small sized components are used to accomplish the switching.

Other objects and advantages will become apparent from the following description taken in conjunction with the accompanying drawings in which.

Figure 1:
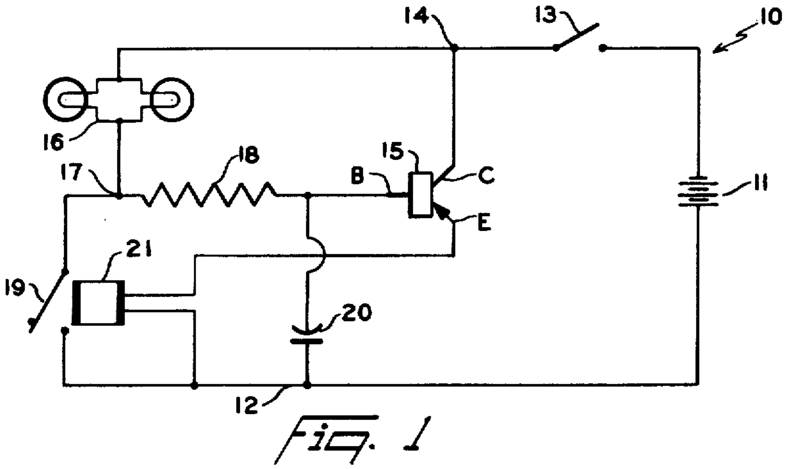
FIGURE 1 is a schematic circuit diagram of a transistor oscillator circuit arranged in accordance with the present invention.

With reference to FIGURE 1, the flasher circuit 10 includes a source of direct current 11 which for the type of flasher contemplated is a 12 volt battery. The positive terminal of the battery 11 is connected to a point of reference potential 12 and the negative terminal thereof is connected in series with an operating or "on and off" switch 13 to a reference point 14.

The reference point 14 is connected to the collector electrode C of a PNP transistor 15 and to the load 16, which in the embodiment disclosed herein consists of a plurality of tungsten lamps connected in parallel. The other side of the load is connected to reference point 17 which in turn is connected to one terminal of the normally open relay contact 19 and also via resistor 18 to the base electrode B of transistor 15. The other terminal of relay contact 19 is connected to reference point 12.

Capacitor 20 is connected between the base electrode of transistor 15 and reference point 12. The emitter electrode E of transistor 15 is connected to one terminal of relay 21, the other terminal of the relay being connected to reference point 12.

The operation of the above described circuit is substantially as follows: At the start of the cycle, indicated at the point O in FIGURES 2 and 3, switch 13 is open, capacitor 20 is discharged, and the transistor 15 is not conducting.

When switch 13 is closed the first phase (indicated from *o* to *a* in FIGURES 2 and 3) of the cycle commences. Battery voltage is applied to the base B of the transistor through load 16 and resistor 18. The capacitor 10 begins to charge and the voltage differential between the base of the transistor to reference point 12 begins to increase.

Figure 2:
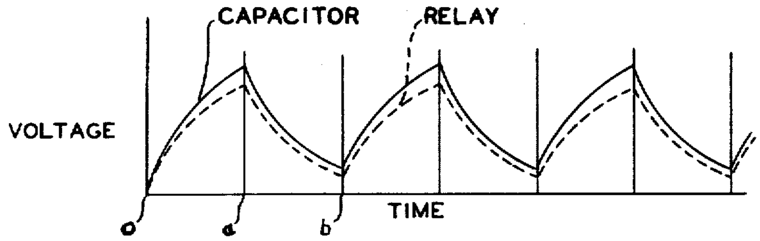
FIGURE 2 is an idealized voltage-time diagram illustrating the operation of the device of FIG. 1.

Voltage at the emitter E of the transistor equals the base voltage less the transistor base-emitter voltage drop and, as the voltage at base B rises the voltage across relay 21 rises also. This is illustrated in FIGURE 2 in which the voltage across the capacitor 20 is shown by a solid line and the voltage across the relay is shown by a broken line.

Figure 3:
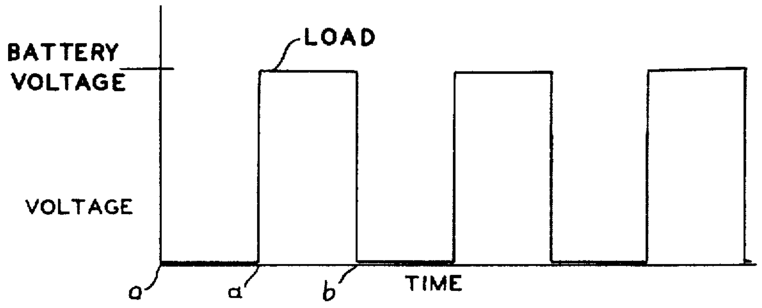
FIGURE 3 is a diagram similar to FIG. 2 illustrating the operation of the lamps.

Transistor 15 provides current amplification so that a small current in the base circuit can control a much larger current in the relay 11. During the period in which capacitor 20 is charging, the current through the load 16 is relatively small and the lamps do not light. This is illustrated in FIGURE 3 in which the voltage across the load is plotted as a function of time on the same scale as FIGURE 2. During the first phase of the cycle shown from *o* to *a* in FIGURE 3 the voltage across the lamps is but a small fraction of the battery voltage.

When the voltage across relay 21 reaches the operating or "pull-in" voltage of the relay, the normally open contact 19 closes and places the full battery voltage across the lamp load. The lamps accordingly flash on, as indicated by the vertical line at *a* in FIGURE 3, and the lamps remain lighted during the second phase of the cycle, indicated from *a* to *b* in FIGURES 2 and 3.

During the second phase, reference point 17 is connected directly to reference point 12 through the relay contact 19, and capacitor 20 begins to discharge through resistor 18 and relay contact 19. The voltage at the base B of the transistor, accordingly, falls and the voltage at the emitter E of the transistor follows the base voltage down.

When the voltage across relay 21 reaches the release or "drop-out" voltage of the relay, contact 19 opens and the cycle is completed as the lamps blink out as indicated by the vertical line at *b* in FIGURE 3.

As long as switch 13 remains closed the cycle is repeated and the circuit continues to oscillate with the voltage across the relay oscillating between the values required for "pull-in" and "drop-out." While the switch is closed current is continuously flowing, build-up and drop-off of the potential is initiated through the resistor 18, and the rise and fall of voltage in the relay 21 is through the transistor collector-emitter circuit. Consequently there is no voltage surge and no large "spikes" occur during the switching action.

In a constructed embodiment of the invention, a flash rate of 90 per minute was obtained by using the following circuit constants, and these are listed herein merely by way of example and are not intended in any way to limit the invention.

| | | |
|---|---|---|
| Resistor | ohms | 470 |
| Capacitor | microfarads | 550 |
| Relay coil | ohms | 40 |
| Relay contacts | amperes | 20 |
| Direct current source | volts | 12 |

While the invention has been described with transistor 15 as a PNP type for the purpose of disclosure, it will be understood that a transistor of the NPN type could be substituted in the circuit by simply reversing the polarity of battery and capacitor.

As will be apparent to those familiar with the art, the invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. In an electronic switching circuit: a source of direct current and a switch in series; a transistor connected as an emitter follower with a relay in the emitter circuit; and a charging circuit connected across the battery and switch comprising a load, charging resistor, and charging capacitor, the junction of the charging resistor and charging capacitor being connected to the base of the transistor; said relay having a normally open contact adapted when closed to connect the battery voltage across the lamp load; the closing of the relay contact allowing the charging capacitor to discharge through the charging resistor.

2. An electronic switching circuit comprising: a battery and switch in series; a transistor; a series combination of a relay, the transistor emitter, and the transistor collector in that order connected across the battery and switch; a second series combination of a load and a normally open contact in said relay connected across the battery and switch; and a third series combination of a capacitor and a resistor connected across the relay contact, the junction point of the resistor and capacitor being connected to the base of the transistor.

3. In an electronic switching circuit: a source of direct current, a load, resistance means and a capacitor connected in series; a relay and the collector and emitter electrodes of a transistor connected across said source, said relay being connected to the emitter of the transistor; the junction point of the resistor and capacitor being connected to the base electrode of said transistor; and a normally open contact in said relay adapted to complete a circuit when said relay is energized to place substantially the full potential of said source across said load.

4. In a transistor oscillator circuit: a source of direct current one terminal of which is connected to a point of reference potential; a load, a resistor and a capacitor connected in series, said load comprising a plurality of lamps connected in parallel and being connected to the other terminal of said source, said capacitor being connected to said point of reference potential; a transistor; a series combination of a relay and the collector-emitter circuit of said transistor connected across said terminals, said relay being connected between the emitter and the point of reference potential; the base of said transistor being connected to the junction point of the resistor and capacitor; and a normally open contact in said relay connecting said load with said point of reference potential to bypass said resistor and capacitor when the relay is energized.

5. In an electronic switching circuit: a source of direct current and a switch in series; a transistor; a relay connected to the emitter electrode of said transistor, said transistor having its collector and emitter circuit including said relay connected across said source and switch; a load; said relay having a normally open contact connected in series with said load, said load and relay contact being connected across said source and switch in parallel with said transistor collector-emitter circuit; and means connecting said load, the base electrode of said transistor and said source to alter the potential at said base electrode when said switch is closed thereby causing current flowing through said collector-emitter circuit to energize said relay and complete a circuit through said source, switch, load and relay contact.

6. A circuit as defined in claim 5 wherein said potential altering means comprises a resistor and capacitor connected in series between said load and source, the junction point of said resistor and capacitor being connected to said base electrode.

7. In an electronic switching circuit: an operating switch; a source of direct current connected on one side to a point of reference potential and on its other side to one terminal of said switch; a transistor having its collector electrode connected to the other terminal of said switch; a relay connected between the emitter electrode of said transistor and said point of reference potential; a load and a normally open contact connected in series between said other switch terminal and said point of reference potential, said contact being movable into closed position by said relay when the latter is energized; and means connecting the junction point of said load and relay operated contact with the base electrode of said transistor and said point of reference potential to alter the potential at said base electrode when said operating switch is closed thereby causing current flowing through the collector-emitter path of said transistor to energize said relay and complete a circuit through said source, switch, load and relay operated contact.

8. A circuit as defined in claim 7 wherein said potential altering means comprises a resistor and a capacitor connected in series between said load-contact junction point and said point of reference potential, the junction point of said resistor and capacitor being connected to said base electrode.

9. In a transistor oscillator circuit: an operating switch; a battery having one terminal connected to a point of reference potential and the other terminal connected to one contact of said switch; the other terminal of the switch being connected to the collector electrode of a junction transistor and to one terminal of a lamp load; a resistor and capacitor in series, the resistor being connected to the other terminal of said load and the capacitor connected to said point of reference potential, and the junction point between said resistor and capacitor being connected to the base electrode of said transistor; and a relay connected in series between the emitter electrode of said transistor and said point of reference potential, said relay having a normally open contact operable to connect said other terminal of the load with said point of reference potential when the relay is energized.

10. In a lamp flasher circuit having a cycle comprising uniform off and on phases: an operating switch; a triode junction transistor; a battery having one terminal connected to a point of reference potential and the other terminal connected to one contact of said switch, the other contact of the switch being connected to one terminal of a lamp load and to the collector electrode of said transistor; a relay connected between the emitter electrode of said transistor and said point of reference potential; the base electrode of the transistor being connected to one terminal of a resistor and to a first terminal of a capacitor, the second terminal of the capacitor being connected to said point of reference potential, and said other resistor terminal being connected to the other terminal of said load to charge said capacitor when the switch is closed thereby causing current to flow through said collector-emiter circuit to energize said relay during the off phase of the cycle; and a normally open contact in said relay adapted to connect said other terminal of the load directly to said point of reference potential when the switch is closed and said relay is energized to close said relay contact, whereby said capacitor is discharged causing the voltage at the transistor to fall and the relay to become deenergized, during the on phase of the cycle.

No references cited.

Disclaimer 3,113,242.—*Harry A. Leeder, Jr.*, Skaneateles, N.Y. FLASHING LAMP CIRCUIT USING A TRANSISTOR OSCILLATOR. Patent dated Dec. 3, 1963. Disclaimer filed June 13, 1969, by the assignee, *R. E. Dietz Company.*

Hereby enters this disclaimer to claims 1, 2, 3, 5 and 6 of said patent.

[*Official Gazette February 3, 1970.*]

Notice of Adverse Decision in Interference

In Interference No. 94,429 involving Patent No. 3,113,242, H. A. Leeder, Jr., FLASHING LAMP CIRCUIT USING A TRANSISTOR OSCILLATOR, final judgment adverse to the patentee was rendered Aug. 9, 1966, as to claims 1, 2, 3, 5 and 6.

[*Official Gazette June 2, 1970.*]